(12) United States Patent
Cho (10) Patent No.: US 8,002,412 B2
(45) Date of Patent: Aug. 23, 2011

(54) PROJECTION SYSTEM EMPLOYING SEMICONDUCTOR DIODE

(75) Inventor: Jae-hee Cho, Yongin-si (KR)

(73) Assignee: Samsung LED Co., Ltd., Suwon, Gyunggi-Do (KR)

( * ) Notice: Subject to any disclaimer, the term of this patent is extended or adjusted under 35 U.S.C. 154(b) by 910 days.

(21) Appl. No.: 11/508,910

(22) Filed: Aug. 24, 2006

(65) Prior Publication Data
US 2007/0165188 A1    Jul. 19, 2007

(30) Foreign Application Priority Data

Jan. 19, 2006    (KR) .................. 10-2006-0005843

(51) Int. Cl.
*G03B 21/00*    (2006.01)
(52) U.S. Cl. ............. 353/31; 353/33; 353/97; 353/100; 353/102; 353/122; 257/290; 257/85; 257/E27.12; 257/E31.096; 257/98; 257/99; 257/100; 257/21; 257/184; 257/432; 257/437; 257/458; 359/237; 359/242; 359/248; 372/1; 372/11; 372/12
(58) Field of Classification Search .............. 353/31, 353/33, 97, 100, 102, 122; 359/237, 242, 359/248; 257/98, 99, 100, 21, 184, 432, 257/437, 458, 290, 85, E27.12, E31.096; 372/11, 12, 43, 1; 362/296.04, 373, 298, 362/583, 560
See application file for complete search history.

(56) References Cited

U.S. PATENT DOCUMENTS 5,105,240 A * 4/1992 Omura ............................. 257/85
5,426,312 A * 6/1995 Whitehead ...................... 257/21
5,615,143 A * 3/1997 MacDonald et al. ......... 365/112
5,696,389 A * 12/1997 Ishikawa et al. ............... 257/99
6,137,635 A * 10/2000 Nakazawa .................... 359/621

(Continued)

FOREIGN PATENT DOCUMENTS

JP    63-116123    5/1988

(Continued)

OTHER PUBLICATIONS

Office Action dated Feb. 8, 2011 in corresponding JP Application No. 2006-341806, and English-language translation, 6 pages.
Junique et al, "GaAs-based multiple-quantum-well spatial light modulators fabricated by a wafer-scale process" Applied Optics, Mar. 20, 2005, vol. 44, No. 9, pp. 1635-1641.
Wood et al, High-Speed 2×2 Electrically Driven Spatial Light Modulator Made With GaAs/AIGaAs Multiple Quantum Wells (MQWs), Electronics Letters, Aug. 13, 1987, vol. 23, No. 17, pp. 916-917.

*Primary Examiner* — Georgia Y Epps
*Assistant Examiner* — Sultan Chowdhury
(74) *Attorney, Agent, or Firm* — Buchanan Ingersoll & Rooney PC (57) ABSTRACT

A projection system includes a light source module illuminating a plurality of monochromic lights, at least one optical modulator modulating the lights illuminated by the light source module according to each of color signals, a color combining prism combining the monochromic lights modulated by the optical modulator to form an image, and a projection lens projecting the image formed by the color combining prism toward a screen. A semiconductor diode including a P type semiconductor layer, an intrinsic semiconductor layer, and an N type semiconductor layer to absorb or transmit the monochromic lights according to the value of a reverse bias voltage is arranged in units of pixels.

10 Claims, 5 Drawing Sheets

U.S. PATENT DOCUMENTS

| | | | |
|---|---|---|---|
| 6,403,975 B1 * | 6/2002 | Brunner et al. | 257/15 |
| 2001/0022613 A1 | 9/2001 | Matsui et al. | |
| 2001/0053165 A1 * | 12/2001 | Wang et al. | 372/38.02 |
| 2002/0104997 A1 * | 8/2002 | Kuo et al. | 257/79 |
| 2004/0062282 A1 * | 4/2004 | Matsuoka et al. | 372/26 |
| 2005/0051790 A1 * | 3/2005 | Ueda | 257/99 |
| 2008/0123343 A1 * | 5/2008 | Kobayashi et al. | 362/298 |

FOREIGN PATENT DOCUMENTS

| | | |
|---|---|---|
| JP | 01-179125 | 7/1989 |
| JP | 10-293545 | 11/1998 |
| JP | 10-326080 | 12/1998 |

* cited by examiner

PROJECTION SYSTEM EMPLOYING SEMICONDUCTOR DIODE

CROSS-REFERENCE TO RELATED PATENT APPLICATIONS

Priority is claimed to Korean Patent Application No. 10-2006-0005843, filed on Jan. 19, 2006, in the Korean Intellectual Property Office, the disclosure of which is incorporated herein in its entirety by reference.

BACKGROUND OF THE DISCLOSURE

1. Field of the Disclosure

The present disclosure relates to a projection system, and more particularly, to a projection system having a high optical efficiency and a fast optical modulation speed.

2. Description of the Related Art

Recently, while display devices are becoming lighter and thinner, the size of screens of the display devices are increasing. A projector or projection TV is a typical display capable of providing a large screen. Micro-display devices that are the results of new technology for projection systems include transmission type LCD (liquid crystal display) panels, reflection type LCOS (liquid crystal on Silicon) panels, and DMD (digital micro mirror device) panels. Also, micro-display devices include a one-panel method, a two-panel method, and a three-panel method according to how many micro-display devices are used. The three-panel method is common to transmission type LCD panel displays while the one-panel method is generally used by DMD panel displays. For LCOS panels, all of the one-panel method, two-panel method, and three-panel method are used.

Figure 1:
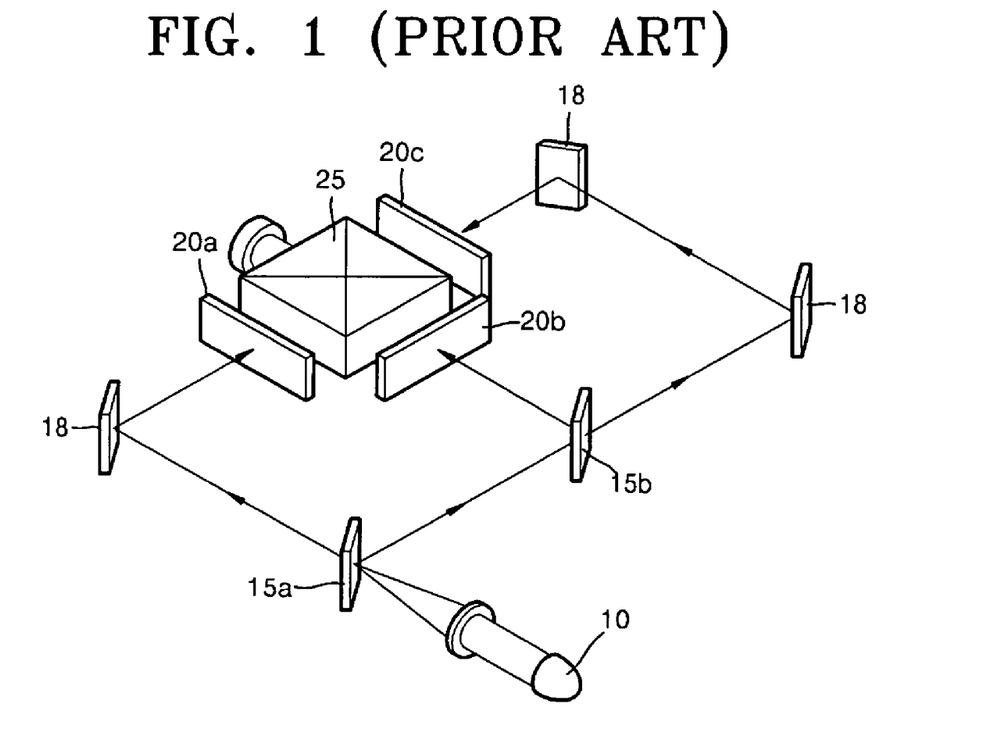
FIG. 1 is a perspective view showing the configuration of a conventional projection system using a transmission type LCD.

FIG. 1 is a perspective view showing the configuration of a conventional projection system using a transmission type LCD. Referring to FIG. 1, a projection system using a transmission type LCD includes a light source 10, two dichroic mirrors 15a and 15b that split light emitted from the light source 10 into red, green, and blue lights, LCD panels 20a, 20b, and 20c modulating the lights split by the dichroic mirrors 15a and 15b and changing a path thereof by three mirrors 18, according to an input signal, and a color combining prism 25 combining images of the LCD panels 20a, 20b, and 20c.

However, this projection system employing the three-panel method has a bulky structure and the optical efficiency of the projection system is low because a polarizer that is an essential part of each of the LCD panels 20a, 20b, and 20c has a high light absorption characteristic. Also, in the LCD panel method, since light is modulated by the alignment of liquid crystal between alignment films, returning of the liquid crystal according to a control signal to its original alignment direction takes some time so that a modulation speed is slow.

Figure 2:
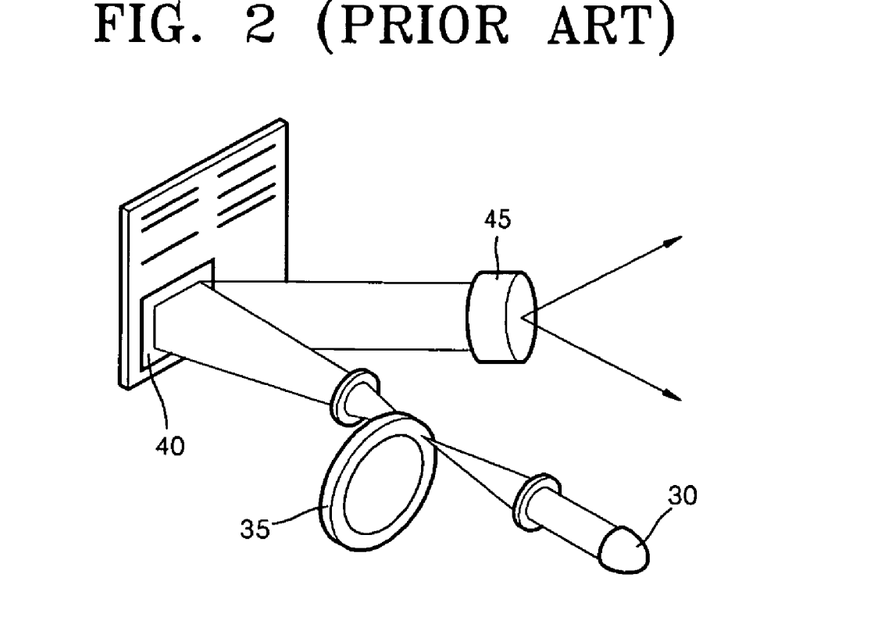
FIG. 2 is a perspective view showing the configuration of a conventional one-panel type DLP projection system using a DMD panel.

FIG. 2 is a perspective view showing the configuration of a conventional one-panel type DLP (digital light processing) projection system using a DMD panel. Referring to FIG. 2, a DLP projection system includes a light source 30, a color filter 35 sequentially splitting red, green, and blue lights according to time, a DMD 40 sequentially displaying screen information of each color, and a projection lens 45 projecting the light from the DMD 40 onto a screen.

The projection system employing the DMD can adopt the one-panel method because the optical efficiency is higher than a case using the LCD panel. Thus, the number of optical parts can be reduced. However, the DMD is supplied only by Texas Instruments Incorporated in the U.S. Furthermore, the DLP projection system has a halo effect that a gray band occurs around an image by stray light that is bounced off the edges of the micro-mirrors of the DMD.

SUMMARY OF THE DISCLOSURE

To solve the above and/or other problems, the present disclosure provides a projection system having a high optical efficiency and a fast optical modulation speed According to an aspect of the present disclosure, a projection system includes a light source module emitting a plurality of monochromic lights; at least one optical modulator modulating light emitted by the light source module according to a color signal, wherein the at least one optical modulator includes at least one semiconductor diode including a P type semiconductor layer, an intrinsic semiconductor layer, and an N type semiconductor layer, the at least one semiconductor diode absorbing or transmitting monochromic light from the light source module according to the value of a reverse bias voltage corresponding the color signal; a color combining prism combining the monochromic lights including light modulated by the optical modulator to form an image; and a projection lens projecting the image formed by the color combining prism toward a screen.

BRIEF DESCRIPTION OF THE DRAWINGS

The above and other features and advantages of the present disclosure will become more apparent by describing in detail preferred embodiments thereof with reference to the attached drawings in which.

DETAILED DESCRIPTION OF THE DISCLOSURE

Figure 3:
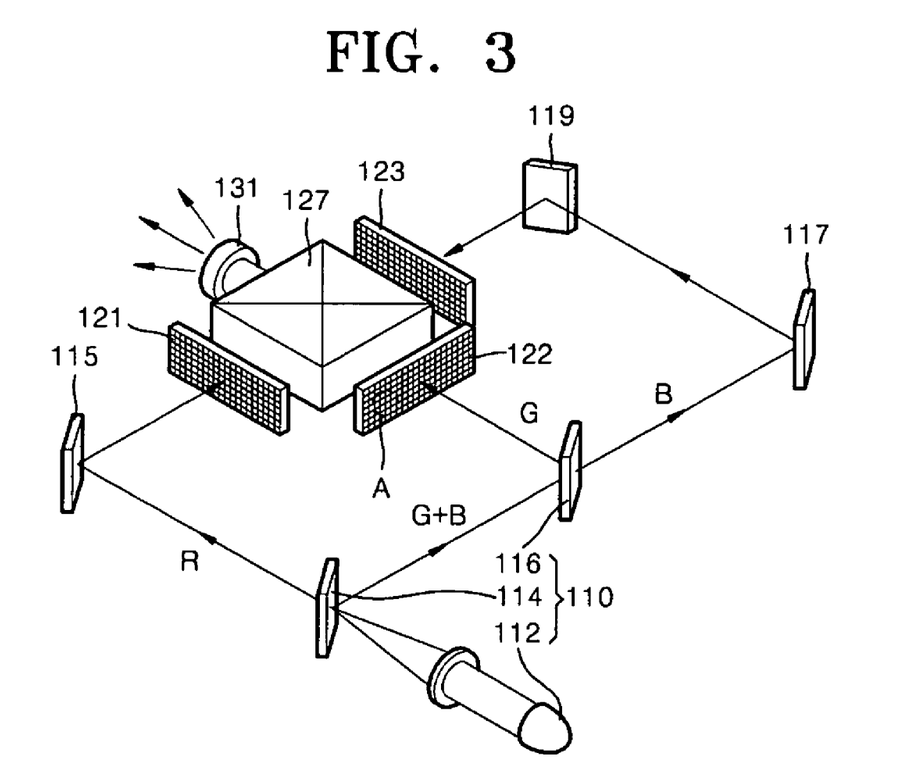
FIG. 3 is a perspective view showing the configuration of a projection system according to an embodiment of the present disclosure.

Referring to FIG. 3, a projection system according to an embodiment of the present disclosure includes a light source module 110 illuminating a plurality of monochromic lights, optical modulators 121, 122, and 123 modulating the monochromic lights illuminated by the light source module 110 according to each of color signals, a color combining prism 127 combining the monochromic lights modulated by the optical modulators 121, 122, and 123, and a projection lens 131 projecting a light combined by the color combining prism 127 onto a screen (not shown).

The light source module 110 includes a white light source 112 and first and second dichroic mirrors 114 and 116 which split the light emitting from the white light source 112 into first, second, and third lights. The first, second, and third lights may be red light (R), blue light (B), or green light (G), respectively. The first dichroic mirror 114 transmits the red light (R) and simultaneously reflects the other lights (G+B). The second dichroic mirror 116 transmits the blue light (B) and simultaneously reflects the other light (G). Red, green and blue are typical but other color combinations are of course possible.

The optical modulators 121, 122, and 123 which modulate the illuminated light according to each of the color signals include a first optical modulator 121 controlling turning on/off of the red light, a second optical modulator 122 controlling turning on/off of the green light, and a third optical modulator 123 controlling turning on/off of the blue light. A first mirror 115 is arranged between the first dichroic mirror 114 and the first optical modulator 121. A second mirror 117 and a third mirror 119 are sequentially arranged between the second dichroic mirror 116 and the third optical modulator 123.

When the light emitted from the white light source 112 is incident on the first dichroic mirror 114, the first dichroic mirror 114 transmits the red light (R) and reflects the green light (G) and the blue light (B). The red light (R) transmitted by the first dichroic mirror 114 is reflected by the first mirror 115 and incident on the first optical modulator 121.

The green and blue lights (G+B) reflected by the first dichroic mirror 114 is incident on the second dichroic mirror 116. The second dichroic mirror 116 reflects the green light (G) of the incident green and blue lights (G+B) and transmits the blue light (B). The green light (G) reflected by the second dichroic mirror 116 is incident on the second optical modulator 122. The blue light (B) transmitted by the second dichroic mirror 116 is incident on the third optical modulator 123 while a path thereof is changed by the second and third mirrors 117 and 119.

Figure 4:
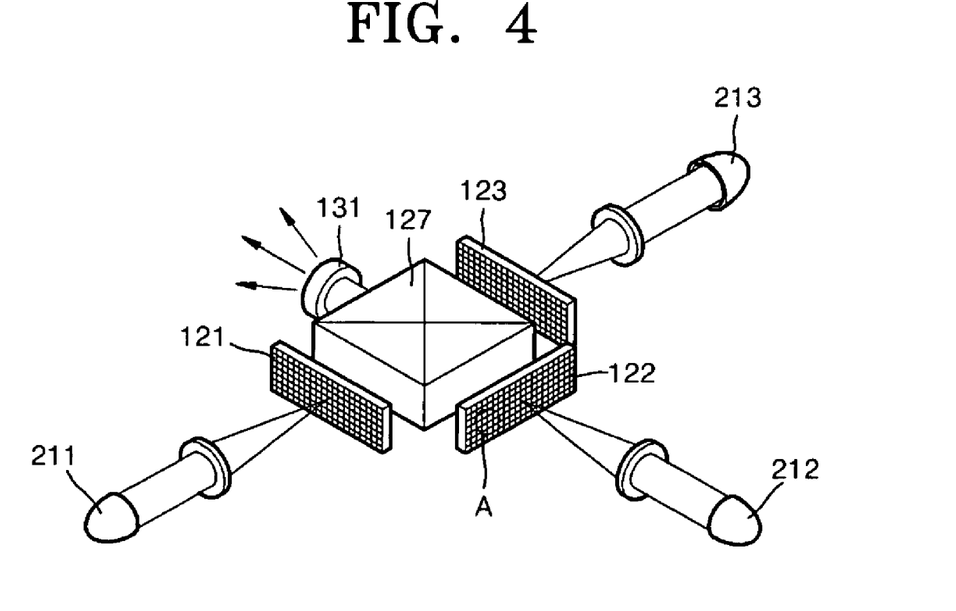
FIG. 4 is a perspective view showing the configuration of a projection system according to another embodiment of the present disclosure.

Alternatively, as shown in FIG. 4, the light source module 110 may include a plurality of monochromic light sources 211, 212, and 213 which are arranged to directly illuminate a monochromic light to each of the optical modulators 121, 122, and 123. Also, the monochromic light sources 211, 212, and 213 may be, for example, light emitting diodes or laser diodes respectively emitting the red light, the blue light, and the green light.

A color combining prism 127 having surfaces respectively facing the first through third optical modulators 121-123 is arranged in front of the first through third optical modulators 121-123. A projection lens 131 is arranged in front of the color combining prism 127. The lights incident on the first through third optical modulators 121-123 and modulated according to a principle that is described later are combined by the color combining prism 127 and projected by the projection lens 131 onto a screen (not shown).

Referring to FIGS. 5 through 8, the structure of an optical modulator employed in the projection system according to the present disclosure, the structure of a semiconductor diode constituting the optical modulator, and the principle that the semiconductor diode transmits or absorbs light will be described in detail.

Figure 5:
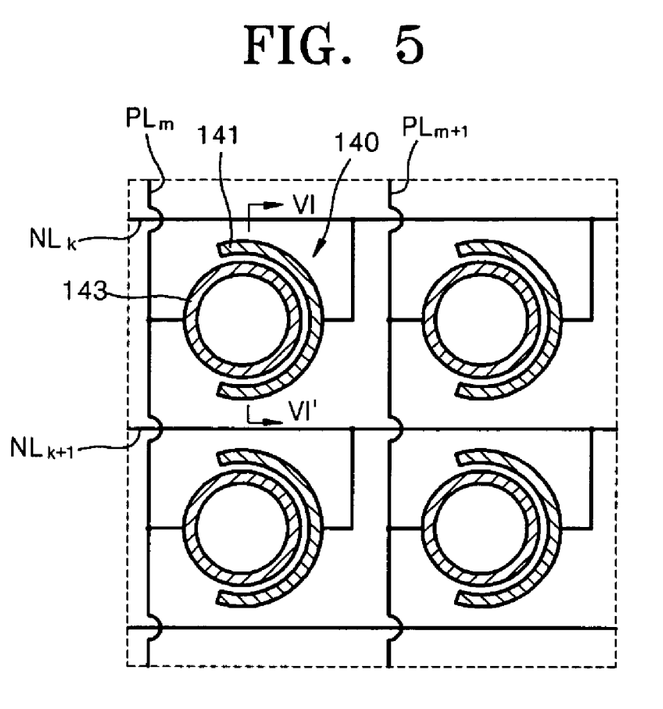
FIG. 5 is a magnified view of a portion A of the optical modulator of FIGS. 3 and 4.

FIG. 5 s a magnified view of a portion A of the optical modulator of FIGS. 3 and 4, in which a plurality of semiconductor diodes 140 are arranged in a 2-dimensional array. Referring to FIG. 5, each of the semiconductor diodes 140 constituting an optical modulator includes a P type electrode 143 and an N type electrode 141 so that a reverse bias voltage can be applied. In the 2-dimensional array, for example, the N type electrode 141 of one of the semiconductor diodes 140 located in a k row and m column is connected to an N-terminal line $NL_k$ arranged in a row direction and having a predetermined electric potential value $V_{N,k}$ (k=1, 2, 3, . . .). The P type electrode 143 of one of the semiconductor diodes 140 is connected to a P-terminal line $PL_m$ arranged in a column direction and having a predetermined electric potential value $V_{P,m}$ (m=1, 2, 3, . . .).

The difference ($V_{N,k}-V_{P,m}$) between the electric potential values of the terminal lines $NL_k$ and $PL_m$ to which the N type electrode 141 and the P type electrode 143 are connected corresponds to the value of the reverse bias voltage $V_R$ applied to the semiconductor diodes 140. Each of the semiconductor diodes 140 corresponds to a pixel and transmits (on) or absorbs (off) light according to the value of the applied reverse bias voltage as it will be described later. The shape of the semiconductor diodes 140 including the P type and N type electrodes 143 and 141 is not limited to the above description and other shapes can be adopted considering other factors such as an image characteristic.

Figure 6:
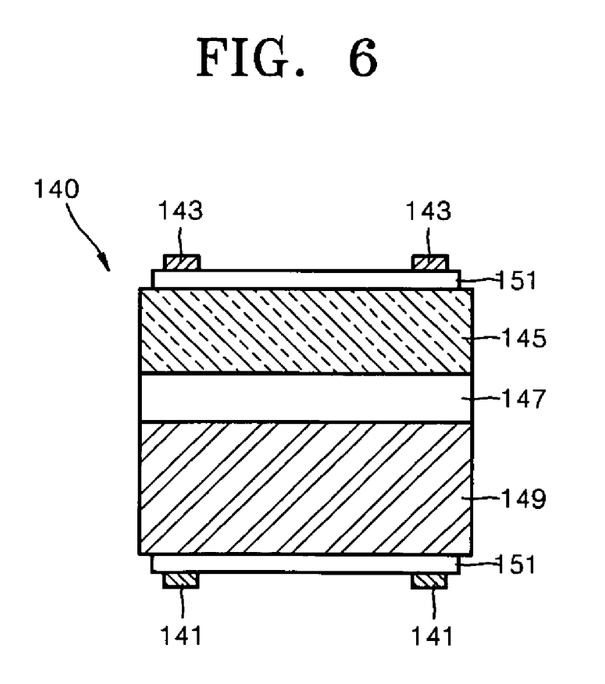
FIG. 6 is a cross-sectional view taken along line VI-VI' of FIG. 5.

FIG. 6 is a cross-sectional view taken along line VI-VI' of FIG. 5. Referring to FIG. 6, one of the semiconductor diodes 140 has a P—I—N structure including a P type semiconductor layer 145, an intrinsic semiconductor layer 147 and an N type semiconductor layer 149. The P type electrode 143 and the N type electrode 141 are formed on an upper surface of the P type semiconductor layer 145 and a lower surface of the N type semiconductor layer 149, respectively. A transparent electrode 151 is provided between the P type semiconductor layer 145 and the P type electrode 143 and between the N type semiconductor layer 149 and the N type electrode 141. The transparent electrode 151 can be formed of, for example, ITO, ZnO, TCO, or NiO.

The semiconductor diodes 140 absorb or transmits incident light according to the energy of the incident light and the amount of a band gap energy $E_g$ of the intrinsic semiconductor layer 147. That is, the intrinsic semiconductor layer 147 works as a light absorbing layer. When the energy of incident light is greater than the band gap energy $E_g$ of the intrinsic semiconductor layer 146, the incident light is absorbed. Otherwise, the incident light is transmitted. The intrinsic semiconductor layer 147 may have a multiple quantum well structure.

The band gap energy $E_g$ is characteristically decreased as the reverse bias voltage increases. When the electric field is applied across the semiconductor layers to apply reverse bias voltage, electric potential energy is added to the energy band. Since the value of the added electric potential energy varies according to the position in the semiconductor layer, the energy band is inclined and accordingly the band gap energy decreases. This is referred to as a quantum-confinement stark effect. As the band gap energy decreases, the energy of the incident light absorbed by the intrinsic semiconductor layer 147 decreases.

Figure 7:
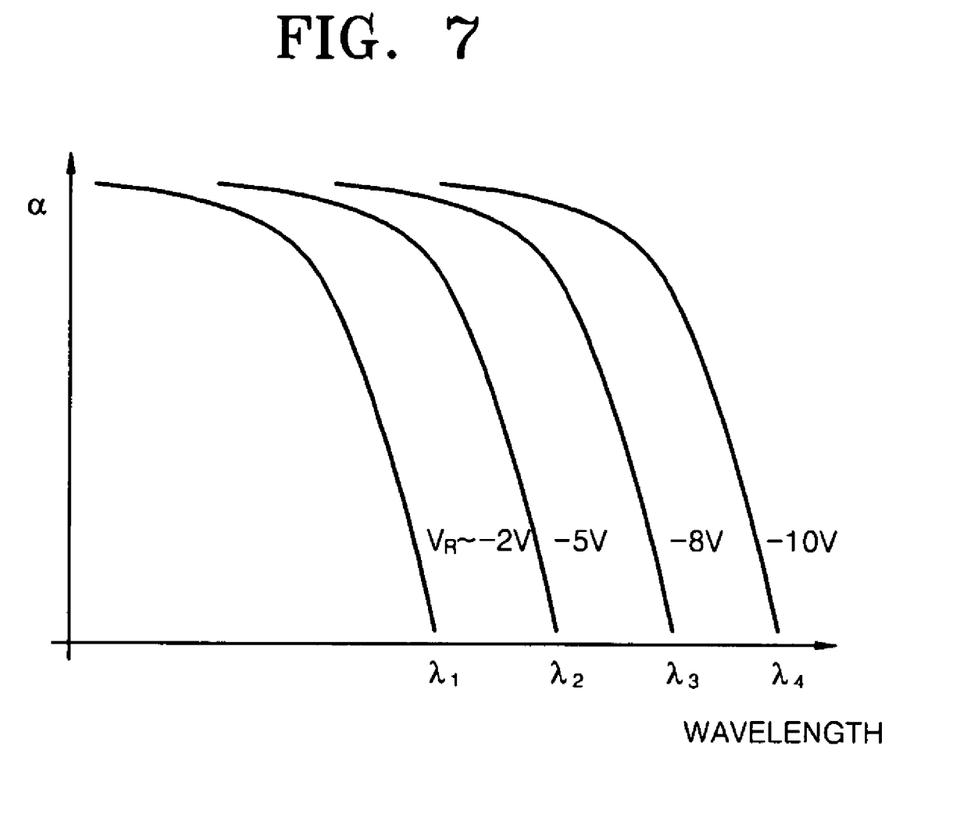
FIG. 7 is a graph schematically showing a change in absorption spectrum according to a reverse bias voltage.

FIG. 7 is a graph schematically showing a change in absorption spectrum according to the reverse bias voltage. In FIG. 7, the x axis indicates the wavelength of incident light while the y axis indicates an absorption coefficient "α". When the applied reverse bias voltage are respectively −2V, −5V, −8V, and −10V, $\lambda_1$, $\lambda_2$, $\lambda_3$, and $\lambda_4$ mean the minimum wavelengths at which the light is not absorbed but starts to be transmitted. As the applied reverse bias voltage increases, the absorption spectrum move right. That is, as the reverse bias voltage increases, the minimum wavelength which can transmit the semiconductor diode 140 increases. Thus, by appropriately designing the band gap energy when the reverse voltage is not applied and the band gap energy when the reverse voltage is applied, light in a particular wavelength band can be turned on/off.

Figure 8:
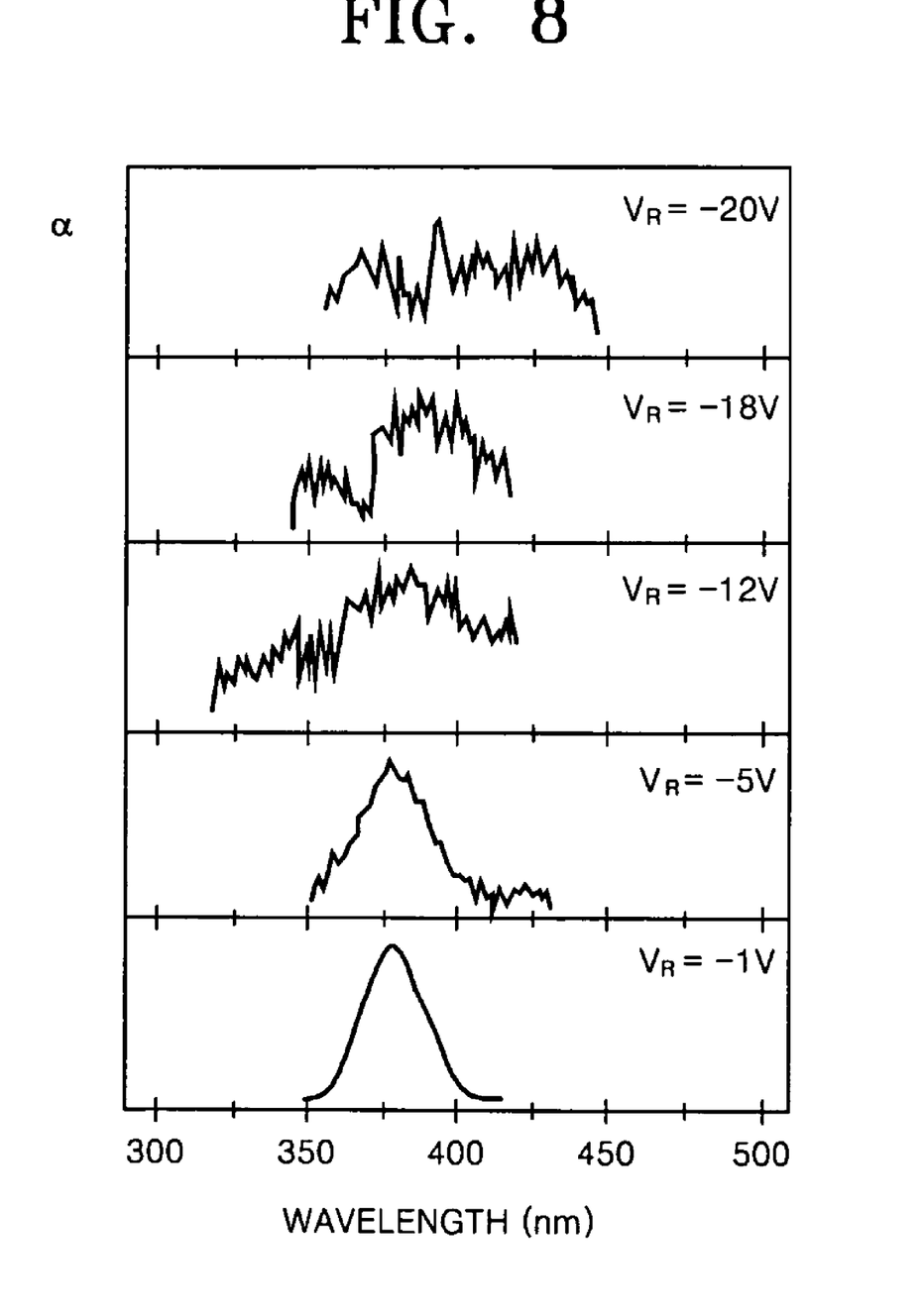
FIG. 8 is a graph showing the measurement of a change in absorption spectrum according to a reverse bias voltage.

FIG. 8 is a graph showing the measurement of a change in the absorption spectrum according to the reverse bias voltage. Here, the semiconductor diode used in measurement is formed of GaN that is used for a P type semiconductor layer and the N type semiconductor layer. The intrinsic semiconductor layer has a multiple quantum well structure of InGaN/GaN.

Referring to FIG. 8, as the reverse bias voltage changes from −1V to −20V, the wavelength of a transmission range changed. In a visible ray band of 380-780 nm, it can be seen that the minimum wavelength in the transmission range changes from about 400 nm to 450 nm. For the structure used for the test, the light having a wavelength corresponding to about 400-450 nm is transmitted by the semiconductor diode when the reverse bias voltage is −1V and absorbed when the reverse bias voltage is −20V.

The above test is exemplary and the absorption characteristic is improved or the absorption spectrum is moved to other wavelength band by designing the structure and material of each semiconductor layer of the semiconductor diode as necessary. For example, for the first optical modulator 121 of FIG. 3 to turn the red light on/off, the semiconductor diode 140 is designed to turn on/off the light having a wavelength 560-650 nm corresponding to the wavelength of the red light. Since the wavelength range corresponds to the light energy of about 1.9-2.2 eV, the band gap energy of the intrinsic semiconductor layer 147 that works as an absorption layer in the semiconductor diode 140 must be not more than 1.9 eV as a band gap energy to absorb the red light and not less than 2.2 eV as a band gap energy to transmit the red light. Since the band gap energy is decreased by the reverse bias voltage, the band gap energy is preferably designed to be not less than 2.2 eV based on a zero (0) bias. The intrinsic semiconductor layer can be formed of an InGaAlP-based material.

For the second optical modulator 122 of FIG. 3 to turn the green light on/off, since the energy of the green light is about 2.2-2.5 eV, it is preferably to set the band gap energy of an absorption layer to absorb the green light to not more than 2.2 eV and the band gap energy of the absorption layer to transmit the green light to not less than 2.5 eV. Thus, the band gap energy is preferably designed to be not less than 2.5 eV based on the zero (0) bias. The intrinsic semiconductor layer can be formed of an InGaAlN-based material.

For the third optical modulator 123 of FIG. 3 to turn the blue light on/off, since the energy of the blue light is about 2.5-2.9 eV, the semiconductor diode 140 is designed such that the band gap energy is preferably not less than 2.9 eV based on the zero (0) bias. The intrinsic semiconductor layer can be formed of an InGaAlN-based material.

The light absorption can be generated in the P type semiconductor layer 145 and the N type semiconductor layer 149. The P type semiconductor layer 145 and the N type semiconductor layer 149 are preferably designed to transmit light in a visible ray range in order to effectively turn on/off the light. That is, the band gap energy of the P type semiconductor layer 145 and the N type semiconductor layer 149 preferably have a value greater than about 2.9 eV, that is, the light energy corresponding to the minimum wavelength 430 nm of the blue light.

Each of the monochromic lights incident on the first through third optical modulators 121-123 of FIG. 3 configured as above modulates the light by being absorbed or transmitted while passing through the intrinsic semiconductor layer 147, according to the reverse bias voltage applied to the semiconductor diode corresponding to each of pixels.

As described above, the projection system according to the present disclosure configured as above is characteristic in that the optical modulation is performed using a semiconductor diode. The projection system, in which the semiconductor diode transmits or absorbs the light according to the wavelength of the light, is advantageous in that the light efficiency and the light modulation speed are high because loss of light hardly exists in transmission of the light when the wavelength of the light corresponds to that of the transmission range. Also, it is advantageous that the manufacturing process is simple and cost can be reduced because the structure can be formed on the substrate through an integrated process.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A projection system comprising:
    a light source module emitting a plurality of monochromic lights;
    at least one optical modulator modulating light emitted by the light source module according to a color signal, wherein the at least one optical modulator includes at least one semiconductor diode including a P type semiconductor layer, an N type semiconductor layer, and an intrinsic semiconductor layer located between the P and N type semiconductor layer,
    the intrinsic semiconductor layer of the at least one semiconductor diode absorbing or transmitting monochromic light from the light source module according to the value of a reverse bias voltage corresponding the color signal;
    a color combining prism combining the monochromic lights including light modulated by the optical modulator to form an image; and
    a projection lens projecting the image formed by the color combining prism toward a screen,
    wherein the optical modulator comprises a plurality of said semiconductor diodes arranged in units corresponding to pixels of the image, and a single semiconductor diode corresponds to a single pixel of the image.

2. The projection system of claim 1, wherein the at least one optical modulator comprises a total of three optical modulators including:
    a first optical modulator having an array of a plurality of said semiconductor diodes wherein a band gap energy of the intrinsic semiconductor layer is designed to transmit a red light when the reverse bias voltage is not applied;
    a second optical modulator having an array of a plurality of said semiconductor diodes wherein a band gap energy of the intrinsic semiconductor layer is designed to transmit a green light when the reverse bias voltage is not applied; and
    a third optical modulator having an array of a plurality of said semiconductor diodes wherein a band gap energy of the intrinsic semiconductor layer is designed to transmit a blue light when the reverse bias voltage is not applied.

3. The projection system of claim 2, wherein the semiconductor diode of the first optical modulator includes InGaAlP-based material as a material for the intrinsic semiconductor layer.

4. The projection system of claim 2, wherein the semiconductor diode of the second optical modulator include InGaAlN-based material as a material for the intrinsic semiconductor layer.

5. The projection system of claim 2, wherein the semiconductor diode of the third optical modulator includes InGaAlN-based material as a material for the intrinsic semiconductor layer.

6. The projection system of claim 1, wherein the P type semiconductor layer and the N type semiconductor layer have band gap energy characteristics that permit transmission of all of the blue, green, and red lights.

7. The projection system of claim 6, wherein the light source module comprises:
 a light illuminating a white light; and
 a plurality of dichroic mirrors to split the white light illuminated by the light source into a plurality of color lights.

8. The projection system of claim 7, further comprising a mirror changing an optical path of the light passing through the dichroic mirror to proceed toward the optical modulator.

9. The projection system of claim 6, wherein the light source module comprises a plurality of monochromic light sources.

10. The projection system of claim 9, wherein the monochromic light sources are light emitting diodes or laser diodes which respectively illuminate monochromic lights of red, green, and blue colors.

* * * * *